US 6,599,622 B1

(12) United States Patent
Chu et al.

(10) Patent No.: US 6,599,622 B1
(45) Date of Patent: Jul. 29, 2003

(54) COATED FILMS WITH IMPROVED BARRIER PROPERTIES

(75) Inventors: Shaw-Chang Chu, Princeton Junction, NJ (US); Jay Kin Keung, Victor, NY (US); Tien-Keui Su, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/677,963

(22) Filed: Oct. 3, 2000

Related U.S. Application Data

(63) Continuation-in-part of application No. 09/223,686, filed on Dec. 30, 1998, now abandoned.

(51) Int. Cl.[7] .......................... B32B 27/14; B32B 27/20
(52) U.S. Cl. ....................... 428/323; 428/328; 428/329; 428/331; 428/516
(58) Field of Search ................... 428/323, 328, 428/329, 331, 144, 516, 519, 521

(56) References Cited

U.S. PATENT DOCUMENTS

| | | | | |
|---|---|---|---|---|
| 3,884,870 A | * | 5/1975 | Dodson et al. | 260/40 R |
| 4,409,285 A | * | 10/1983 | Swerdlow | 428/332 |
| 4,410,649 A | * | 10/1983 | Cieloszyk | 524/108 |
| 4,438,176 A | * | 3/1984 | Steiner et al. | 428/349 |
| 4,604,324 A | * | 8/1986 | Nahmias et al. | 428/349 |
| 4,780,364 A | * | 10/1988 | Wade et al. | 428/315.5 |
| 4,794,136 A | * | 12/1988 | Touhsaent | 524/512 |
| 4,865,908 A | * | 9/1989 | Liu et al. | 428/248 |
| 4,886,698 A | * | 12/1989 | Purdy | 428/213 |
| 4,898,787 A | * | 2/1990 | Min et al. | 428/480 |
| 4,911,976 A | * | 3/1990 | Park et al. | 428/216 |
| 4,950,544 A | * | 8/1990 | Touhsaent | 428/411.1 |
| 4,965,130 A | * | 10/1990 | Min et al. | 428/407 |
| 5,093,194 A | * | 3/1992 | Touhsaent et al. | 428/349 |
| 5,166,242 A | * | 11/1992 | Chu et al. | 524/238 |
| 5,169,728 A | * | 12/1992 | Murphy et al. | 428/516 |
| 5,380,586 A | * | 1/1995 | Knoerzer et al. | 428/349 |
| 5,419,960 A | * | 5/1995 | Touhsaent | 428/331 |
| 5,445,856 A | * | 8/1995 | Chaloner-Gill | 428/35.9 |
| 5,562,958 A | * | 10/1996 | Walton et al. | 428/34.9 |
| 5,667,902 A | * | 9/1997 | Brew et al. | 428/518 |
| 6,071,624 A | * | 6/2000 | Hubbard et al. | 428/446 |

* cited by examiner

Primary Examiner—Daniel Zirker
(74) Attorney, Agent, or Firm—Rick F. James; Keith A. Bell

(57) ABSTRACT

A thermoplastic film having a substantially continuous, adherent coating on at least one surface, wherein the coating includes a polymeric binder and nano-scale particles. When the coating is formed on the surface of the film, the nano-scale particles form a barrier that substantially reduces the diffusion of moisture and oxygen. In preferred embodiments, the coating includes a polymeric binder and silicate particles formed on a base substrate layer that includes a polyolefin selected from the group consisting of homopolymers, copolymers, and terpolymers of propylene, ethylene, butylene, and blends thereof.

15 Claims, 1 Drawing Sheet

COATED FILMS WITH IMPROVED BARRIER PROPERTIES

RELATED APPLICATION

This application is a continuation-in-part of U.S. Application Ser. No. 09/223,686, filed on Dec. 30, 1998, now abandoned, entitled "Coated Films with Improved Barrier Properties," the entire disclosure of which is hereby incorporated herein by reference.

FIELD OF THE INVENTION

This invention relates to coating compositions which can be applied to thermoplastic films to provide improved moisture and oxygen barrier properties and good thermal stability. More specifically, the invention relates to coating compositions which use a polymeric binder and a nano-scale particle additive to provide improved moisture and oxygen barriers for thermoplastic films.

BACKGROUND OF THE INVENTION

Polymeric films are used in many commercial applications. One particularly important application is the packaging of food products. Films employed in the food packaging industry are chosen and/or designed to provide characteristics necessary for proper food containment. Such characteristics include water vapor barrier properties, oxygen and gas barrier properties, and flavor and aroma barrier properties. In order to impart these desirable characteristics in a multi-layer film, the films are often designed with one or more barrier layers. In addition to providing barrier properties, the layers must have acceptable clarity so that the products can be viewed through the film. Prior art films that used non-halogenic layers or coatings to provide barrier characteristics suffered from poor clarity and found limited use in the food packaging industry.

Polypropylene and polyethylene films are widely used in the food packaging industry because of their desirable physical properties, such as transparency and strength. Polypropylene and polyethylene films, however, do not provide barrier characteristics that are acceptable for many food packaging applications and in the past additional barrier layers have been used to provide polypropylene and polyethylene films with the required barrier properties.

Halogenic barrier materials are commonly used in the food packaging industry to impart moisture and gas barrier properties to films which do not inherently possess these characteristics. High barrier halogenic coatings or layers, such as polyvinylidene chloride (PVDC), have been used to provide moisture and gas barrier properties in thermoplastic films that include layers of biaxially oriented polypropylene (BOPP) and/or polyethylene terephthalate (PET). PVOH and PVDC, however, are difficult to recycle because they are thermally unstable and tend to degrade rapidly under typical film reprocessing temperatures (350–550° F.). Furthermore, the halogenic barrier materials are relatively expensive and have processing problems that have limited their effectiveness. In particular, when films containing PVDC are irradiated to promote crosslinking, they discolor above certain radiation levels. Thus, there has been a demand for a new barrier coating material that gives improved recyclability and improved processing characteristics.

Aqueous coating compositions containing, in addition to a water soluble or water dispersible film-forming polymer, one or more additives intended to impart a particular property or characteristic to the substrate to which the compositions are applied are known. The most commonly used coating compositions confer clarity, good slip, and good anti-block characteristics upon the film. In addition, coatings containing halogenic polymers, such as PVDC, have been used to impart barrier properties in films but non-halogenic coatings have not been successfully used.

SUMMARY OF THE INVENTION

It has been discovered that the problems experienced in prior art films can be overcome by the present invention which provides a substantially continuous, adherent coating for at least one surface of a thermoplastic film; the coating includes a polymeric binder and nano-scale particles.

The nano-scale particles can be selected from silica, silicate, clay, organomontmorillonite, calcium carbonate, calcined aluminum silicate, hydrated aluminum silicate, calcium phosphate, alumina, barium sulfate, magnesium sulfate, and diatomacious earth. The nano-scale particles have an average particle size of from about 1 nanometer (10 Angstroms) to about 10 nanometers (100 Angstroms), preferably from about 1 nanometer to less than 10 nanometers.

The polymeric binder can be an olefinic copolymer containing a carboxylic acid group or a metal salt-functionalized olefinic copolymer. The polymeric binder can be selected from ethylene acrylic acid, ethylene methyl acrylate and ethylene ethyl acrylate copolymers.

The thermoplastic film can contain a base substrate layer that includes a polyolefin selected from homopolymers, copolymers, and terpolymers of propylene, ethylene, butylene, and blends thereof.

The coating can be applied to the surface of a single layer film or it can be applied to a coextruded layer of a multilayer film, using techniques well known to those skilled in the art, including by gravure coating, roll coating, or spraying.

The coatings of the present invention provide non-halogenic barrier materials for thermoplastic films that are environmentally acceptable because they are readily biodegradable. The coatings also provide a cost-effective alternative to the halogenic barrier materials used in prior art films without sacrificing the high performance required when packaging food products. In addition, the coatings can be applied after the film has been fabricated; therefore, the processing problems experienced with coextruded films having halogenic barrier layers are avoided.

These and other advantages of the present invention will be appreciated from the detailed description and examples which are set forth herein. The detailed description and examples enhance the understanding of the invention, but are not intended to limit the scope of the invention.

DETAILED DESCRIPTION OF THE PREFERRED EMBODIMENTS

Figure 1:
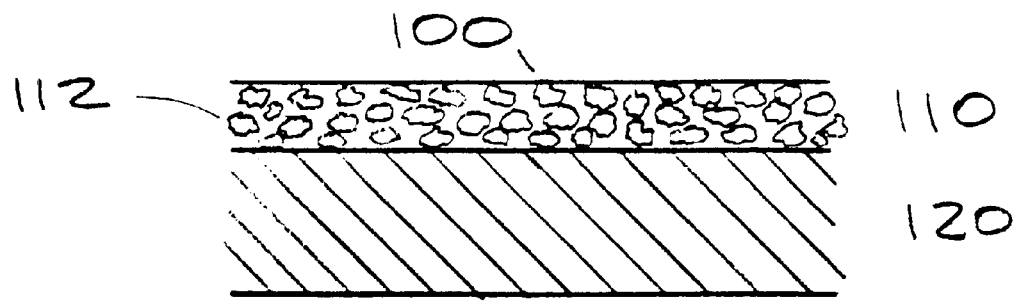
FIG. 1 shows a side view of a prior art coating containing micron-scale particles.

The first component of the present coating composition comprises a polymeric binder. In particular, the first component of the present coating composition comprises a polar, functional comonomer. The polar, functional comonomer contains carboxylic acid or hydroxyl functional groups that are expected to have hydrogen bonding interactions with the carboxylic salt group of the particles, and thus the polar, functional comonomer behaves as a binding or anchoring agent for the particles. Examples of the polar, functional comonomer can include acrylic acid, methacrylic acid, hydroxyethyl acrylate, hydroxyethyl methacrylate, hydroxypropyl acrylate, hydroxypropyl methacrylate, crotonic acid, fumaric acid, itaconic acid, and maleic acid.

The second component of the present coating composition comprises nano-scale particles. Nano-scale particles are particles which have a maximum cross-sectional dimension ranging from 1 to 999 nanometers (i.e., $10^{-9}$ meters). The present nano-scale particles have an average particle size of from about 1 nanometer (10 Angstroms) to about 10 nanometers (100 Angstroms), preferably from about 1 nanometer to less than 10 nanometers. The nano-scale particles are selected from silica, silicate, clay, organomontmorillonite, calcium carbonate, calcined aluminum silicate, hydrated aluminum silicate, calcium phosphate, alumina, barium sulfate, magnesium sulfate, and diatomaceous earth.

Organomontmorillonite is particularly preferred as the nano-scale particles of the present invention. Organomontmorillonite consists of stacked silicate sheets having an average particle size of about 1 nanometer (10 Angstroms).

The first component and the second component are combined to form the present coating composition. The present coating composition can be either a water-based coating or a melt-extrudable coating. For example, an aqueous organomontmorillonite dispersion can be easily blended with an aqueous ethylene acrylic acid copolymer dispersion to form a water-based coating. Alternatively, a powdery montmorillonite can be blended with ethylene acrylic acid copolymer using conventional melt blending equipment to form an extrusion coating.

In a preferred embodiment, an aqueous dispersion containing nano-scale particles is combined with an aqueous dispersion containing the polymeric binder to form a water-based coating. In this preferred embodiment, the first component of the present coating composition comprises a polymeric binder that is an acrylic copolymer emulsion or dispersion. The first component can include at least 5 weight percent, based upon the total weight of the first component, of a polar, functional comonomer. Preferably, the polar, functional comonomer can be present in an amount, based upon the total weight of the first component, of from about 5 to about 60 wt % and, most preferably, from about 10 to about 50 wt %. The first component also includes water in an amount, based upon the total weight of the first component, of from about 40 to about 95 wt % and, most preferably, from about 50 to about 90 wt %. In this preferred embodiment, the first component, i.e., the polar, functional comonomer and water, makes up from about 10 to about 60 wt % of the total coating composition.

In this preferred embodiment, the second component of the present coating composition comprises an aqueous dispersion containing nano-scale particles. The nano-scale particles can be present in an amount of from about 5 to about 20 wt %, based upon the total weight of the second component. The second component also includes water in an amount of from about 80 to about 95 wt %, based upon the total weight of the second component. In this preferred embodiment, the second component, i.e., the nano-scale particles and water, makes up from about 40 to about 90 wt % of the total coating composition.

The base film of the present coated film structure can be a single layer film, or it can be a coextruded or laminated layer of a multilayer film. The base film can include a polyolefin selected from homopolymers, copolymers, and terpolymers of propylene, ethylene, butylene, and blends thereof. Preferred polyolefins include polypropylene (PP), high density polyethylene (HDPE), low density polyethylene (LDPE), linear low density polyethylene (LLDPE), polybutylene (PB), ethylene-vinyl acetate (EVA), and blends thereof. The base film can be made using well known extrusion and laminating methods and, in preferred embodiments, the base film is oriented in at least one direction.

While the coating compositions of the present invention are suitable for application to a wide variety of thermoplastic films, they are especially suitable for application to polypropylene and polyethylene films. Both polypropylene and polyethylene films are well known in the art and widely used in the food packaging industry. Polypropylene films can be the highly stereoregular or highly crystalline type. Preferred polypropylene films are formed by polymerizing polypropylene in the presence of stereospecific catalyst systems. Polypropylene films can also be blends of two or more different polypropylenes. Polyethylene films can be high density polyethylene, low density polyethylene, linear low density polyethylene, very low density polyethylene, or blends thereof. In addition, the films can be multiple layer films having different layers of polypropylene and/or polyethylene or layers that include blends thereof.

The present coating composition can be applied to the surface of a single layer film, or it can be applied to a coextruded layer of a multilayer film, using techniques well known to those skilled in the art, including by gravure coating, roll coating, or spraying. For example, the present coating composition can be applied to the base film using a dispersion coating process. Dispersion coating of plastic films is similar to a printing process. The base film is unwound from a mandrel and the coating applied at the desired thickness. After the coating has dried, the coated film structure is wound up again into a uniform roll. A gravure coating process is the preferred method of applying coatings because it can apply a thin even coating on films. The uniformity of the coating can be advantageously increased by the addition of wetting or dispersing agents (surfactants), such as a fatty acid.

In a preferred embodiment, an aqueous dispersion containing nano-scale particles is combined with an aqueous dispersion containing the polymeric binder to form a water-based coating composition. The coating composition is then applied onto a biaxially oriented polypropylene base film using a gravure coater. Once the water has dried off the coated film, the nano-scale particles make up from about 1 to about 20 wt % of the coating, and preferably from about 3 to about 12 wt % of the coating.

Dispersions containing particles of silicates and other materials that are currently in use employ micron-scale particles that are too large to form an effective gas or moisture barrier. The spaces between these micron-scale particles form sites that allow $O_2$ or $H_2O$ molecules to diffuse through the coatings with relative ease.

The present inventors have discovered that a substantially continuous, adherent coating that comprises a polymeric binder and nano-scale particles provides excellent moisture barrier properties and good thermal stablity. In contrast to the micron-scale particles employed in the past, the present nano-scale particles provide relatively few sites between the particles that can be occupied by $O_2$ and $H_2O$ molecules and thus form a coating that is an effective barrier layer.

For a small molecule, such as $O_2$ or $H_2O$, to permeate a plastic film, the molecule must be soluble in the film and must be able to diffuse through the film. In an amorphous film, small molecules can occupy the spaces between the molecules, or bundles of molecules, that are only loosely entangled. The polymer chain, or bundle of chains, that forms the amorphous film is relatively flexible and holes open rather easily. These holes allow the small molecules to move within the film structure. Diffusion occurs when these small molecules move from site to site within the amorphous structure until they eventually pass through the structure. For relatively stiff and bulky polymer molecules, movement is slow and infrequent and, consequently, fewer holes open.

The halogenic barrier materials used in the prior art combine a highly crystalline structure and a specific chemical structure to restrict the movement of small molecules through films. Crystalline structures reduce the mobility of the polymer system and thereby reduce the diffusion rate of small molecules. Additionally, the chemical structures of halogenic polymers have intramolecular bonding, efficiency of packing, and polymer chain rigidity which not only enhance the degree of crystallinity but also decrease the rate of permeability.

The coatings of the present invention, unlike halogenic barrier materials, do not rely on either a crystalline polymer structure or a specific chemical structure to form an impermeable barrier to moisture and oxygen. Instead, the coatings of the present invention are formed from layered nano-scale particles. Silicate particles are especially effective in forming such layers of nano-scale particles.

Nano-scale particles are so small in size that when they are formed into a layer, there are very few spaces between the particles that are large enough to form sites for the $O_2$ or $H_2O$ molecules to occupy. Because diffusion depends on a molecule moving from site to site as it passes through a structure, the tightly packed particles minimize the number of sites in a structure and, thus, limit diffusion through the structure. Nano-scale particles also provide good clarity and gloss because the particles are too small to either reflect or diffuse light.

Silicate particles that are known in the art and that have been used in coatings are relatively large when compared to the nano-scale particles of the present invention. The silicate particles known in the art are measured in terms of microns. A micron is equal to one millionth ($10^{-6}$) of a meter, or 10,000 Angstrom units. In contrast, the nano-scale particles of the present invention are measured in nanometers. A nanometer is one billionth ($10^{-9}$) of a meter, and it is equal to one millimicron or 10 Angstrom units. Thus, the micron-scale particles are of an order of magnitude of 1,000 times greater than the present nano-scale particles.

Silicate particles have been used in prior art films to improve certain properties of the film, including antiblocking properties. The silicate particles can vary in size within a range of from 0.5 to 15 microns. Silicate particles used as antiblocking agents are typically irregularly-shaped particles whose function is to rise to the surface of a film. If the particles cannot protrude or are too small, then they are less likely to rise to the surface of the film and perform their antiblocking function. Thus, silicate particles used as antiblocking agents do not form a barrier. Instead, when used as antiblocking agents, the silicate particles prevent plastic film surfaces from sticking together when they are tightly rolled up on a mandrel.

FIG. 1 shows a side view of a coated film 100 that includes a base layer 120 with a coating 110 of micron-scale silicate particles 112. The silicate coating 110 has relatively large spaces between the particles 112. These spaces provide sites for the $O_2$ or $H_2O$ molecules to occupy and allow diffusion through the coating 110.

Because of their small size, the present nano-scale particles have unique characteristics and novel applications when used in plastic films. It has been found that the size of the particles used in the coatings of the present invention affect the barrier properties of the films. Larger particles, that is particles in the 0.5 to 15 micron range (micron-scale particles), have larger spaces between the particles and do not disperse as well in polymeric binders as do smaller scale particles. Consequently, coatings made using micron-scale particles do not have good barrier properties.

Figure 2:
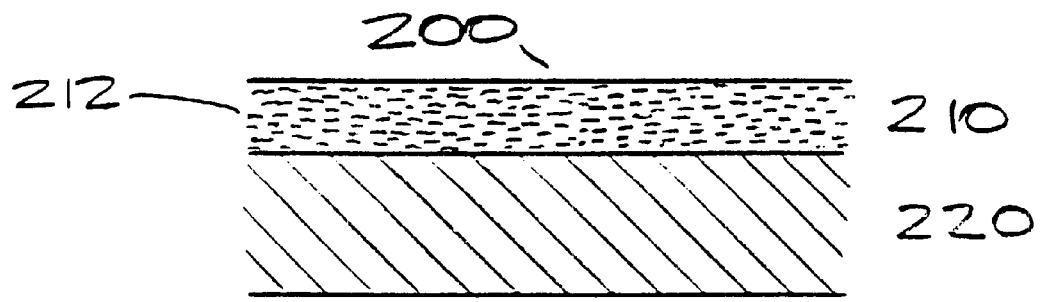
FIG. 2 shows a side view of a coating of the present invention containing nano-scale particles.

Silicate coated films 100 that are currently used (as illustrated in FIG. 1) have a base film 120 coated with micron-scale silicate particles 112. The coating 110 of micron-scale particles 112 has relatively large interstitial sites between the particles 112 which can be occupied by molecules of $O_2$ and $H_2O$. The large number of sites and their relatively large size provide paths in the structure through which $O_2$ and $H_2O$ molecules can diffuse. In contrast, FIG. 2 shows the coated film structure 200 of the present invention, having a base film 220 and a coating 210 of nano-scale particles 212 with relatively few interstitial sites that $O_2$ and $H_2O$ molecules can occupy.

In addition to having smaller interstitial sites, the nano-scale particles 212 of the present invention form a more effective barrier because there are more layers of particles in the coating 210. As shown in FIG. 1 and FIG. 2, a coating 210 of nano-scale particles 212 (FIG. 2) when compared to a coating 110 of micron-scale particles 112 (FIG. 1) of equal thickness has a greater number of layers of particles between the top and bottom surfaces of the coating. The greater number of particles 212 in the coating 210 of the present invention creates a more torturous path through the coating 210 and makes it more difficult for $O_2$ and $H_2O$ molecules to diffuse.

When a molecule diffuses through a structure, the molecule moves from one interstitial site in the structure to another interstitial site. In order for the molecule to pass on to the next site, there must be an adjacent unoccupied site available. If a site is not available, the molecule remains where it is until a site becomes free. The more sites a molecule has to occupy before diffusing through a structure, the slower the rate of diffusion. Therefore, the nano-scale particles 212 of the present invention slow the rate of diffusion in two ways. First, the nano-scale particles 212 decrease the number of available sites that can be occupied by $O_2$ and $H_2O$ molecules, and second, they increase the number of interstitial sites that a molecule must occupy in order to diffuse through the coating 210.

EXAMPLES

In a vessel equipped with a mechanical agitator, an aqueous organomontmorillonite (SCPX 944 of 9.1% solids, obtained from Southern Clay Products, Inc.) was mixed with an ethylene acrylic acid (EAA) copolymer dispersion (MICHEM PRIME 4983 of 25% solids, obtained from Michelman Corp.) at several different ratios (see, Table 1). All of these blends were diluted to 9% solids with water. The resulting coatings were applied on a BOPP film primed with polyethyleneimine using a gravure coater. The coated films had good clarity and showed lower oxygen transmission rates (OTR) and water vapor transmission rates (WVTR) (see, Table 2).

TABLE 1

COMPOSITION OF CLAY/EAA COATINGS

| Coating Composition | Aqueous Clay (9.1% solids) (ml) | EAA Dispersion (25% solids) (ml) | Clay/EAA Ratio (solids/solids) | % Solids Undiluted Solution | Viscosity Undiluted Solution (cps) |
|---|---|---|---|---|---|
| SC96-034 | 500 | 500 | 27/73 | 17.23 | 1,271 |
| SC96-035 | 600 | 400 | 35/65 | 15.65 | 1,581 |
| SC96-036 | 700 | 300 | 46/54 | 14.07 | 1,750 |
| SC96-037 | 800 | 200 | 59/41 | 12.52 | 3,004 |
| SC96-038 | 900 | 100 | 77/23 | 10.90 | 177 |

TABLE 2

OTR AND WVTR OF CLAY/EAA COATED FILMS

| Coated Films | Viscosity Diluted Solution @ 9% Solids (cps) | Coat Weight (g/msi) | OTR (cc/100 in$^2$/day/mil) | WVTR (a) "as is"/aged (g/100 in$^2$/day) |
|---|---|---|---|---|
| SC96-034 | 24.0 | 0.500 | 95 | 0.33/0.29 |
| SC96-035 | 27.6 | 0.572 | 78 | 0.30/0.28 |
| SC96-036 | 43.8 | 0.667 | 46 | 0.27/0.26 |
| SC96-037 | 63.3 | 0.822 | 28 | 0.26/0.26 |
| SC96-038 | 47.4 | 0.912 | 9 | 0.27/0.27 |
| Control (b) | — | — | 125 | 0.37/0.34 |

(a) normalized to 1 mil
(b) uncoated base film

The test results in Table 2 show that films coated with the nano-scale particles of the present invention when compared to the uncoated control film provide improved barrier properties and decrease both the oxygen and moisture transmission rates through the films.

Thus, while preferred embodiments of the present invention have been described herein, those skilled in the art will realize that other embodiments can be made without departing from the spirit of the invention, and it is intended to include all such further modifications and changes as come within the true scope of the claims set forth herein.

What is claimed is:

1. A thermoplastic film comprising a substantially continuous, adherent coating on at least one surface, wherein the coating comprises a first component and a second component, the first component comprises a polymeric binder, the second component comprises nano-scale particles having an average particle size of from about 1 nanometer to about 10 nanometers, and the nano-scale particles comprise from about 3 to about 12 weight percent of the total coating.

2. The thermoplastic film of claim 1, wherein the nano-scale particles have an average particle size of from about 1 nanometer to less than 10 nanometers.

3. The thermoplastic film of claim 1, wherein the nano-scale particles are selected from the group consisting of silica, silicate, clay, organomontmorillonite, calcium carbonate, calcined aluminum silicate, hydrated aluminum silicate, calcium phosphate, alumina, barium sulfate, magnesium sulfate, and diatomacious earth.

4. The thermoplastic film of claim 3, wherein the coating is applied by gravure coating, roll coating, or spraying.

5. The thermoplastic film of claim 1, wherein the nano-scale particles are organomontmorillonite.

6. The thermoplastic film of claim 1, wherein the polymeric binder is selected from the group consisting of ethylene acrylic acid, ethylene methyl acrylate, and ethylene ethyl acrylate copolymers.

7. The thermoplastic film of claim 1, wherein the film further comprises a base substrate layer comprising a polyolefin selected from the group consisting of homopolymers, copolymers, and terpolymers of propylene, ethylene, butylene, and blends thereof.

8. The thermoplastic film of claim 1, wherein the surface is a coextruded layer of a multilayer film.

9. A thermoplastic film comprising a substantially continuous, adherent coating on at least one surface, wherein the coating is applied by:
    (a) forming a coating composition by combining a first component and a second component, the first component comprising an aqueous dispersion containing a polymeric binder and the second component comprising an aqueous dispersion containing nano-scale particles having an average particle size of from about 1 to about 10 nanometers;
    (b) applying the coating composition onto at least one surface of the thermoplastic film by gravure coating, roll coating, or spraying; and
    (c) drying the coated film or allowing the coated film to dry;
and wherein the nano-scale particles comprise from about 3 to about 12 weight percent of the total coating of a dried, coated film.

10. The thermoplastic film of claim 9, wherein the nano-scale particles have an average particle size of from about 1 nanometer to less than 10 nanometers.

11. The thermoplastic film of claim 9, wherein the first component comprises from about 10 to about 60 weight percent of the total coating composition prior to drying.

12. The thermoplastic film of claim 9, wherein the second component comprises from about 40 to about 90 weight percent of the total coating composition prior to drying.

13. The thermoplastic film of claim 9, wherein the nano-scale particles comprise from about 5 to about 20 weight percent of the second component prior to drying.

14. A thermoplastic film comprising a substantially continuous, adherent coating on at least one surface, wherein the coating comprises a first component and a second component, the first component comprises a polymeric binder, the second component comprises nano-scale particles having an average particle size of from about 1 nanometer to about 10 nanometers, the nano-scale particles comprise from about 3 to about 12 wt. percent of the total coating, and the surface of the film is a coextruded layer of a multilayer film.

15. A thermoplastic film comprising a substantially continuous, adherent coating on at least one surface, wherein the coating is applied by:

(a) forming a coating composition by combining a first component and a second component, the first component comprising an aqueous dispersion containing a polymeric binder and the second component comprising an aqueous dispersion containing nano-scale particles having an average particle size of from about 1 to about 10 nanometers, the nano-scale particles comprise from about 3 to about 12 wt. percent of the total coating;

(b) applying the coating composition onto at least one surface of the thermoplastic film by gravure coating, roll coating, or spraying; and (c) drying the coated film or allowing the coated film to dry;

and wherein the surface of the film is a coextruded layer of a multilayer film.

* * * * *